March 13, 1934.  J. L. PEET  1,951,062
COILED STRIP HOLDER
Filed Oct. 11, 1932
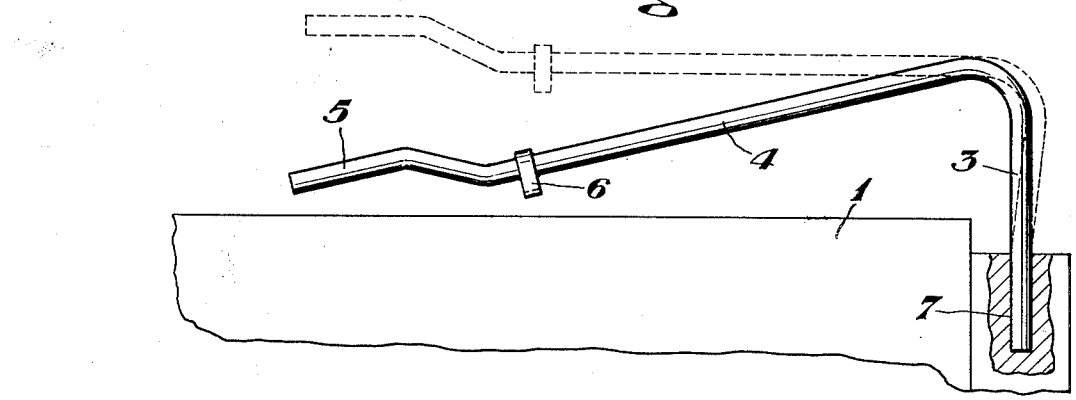
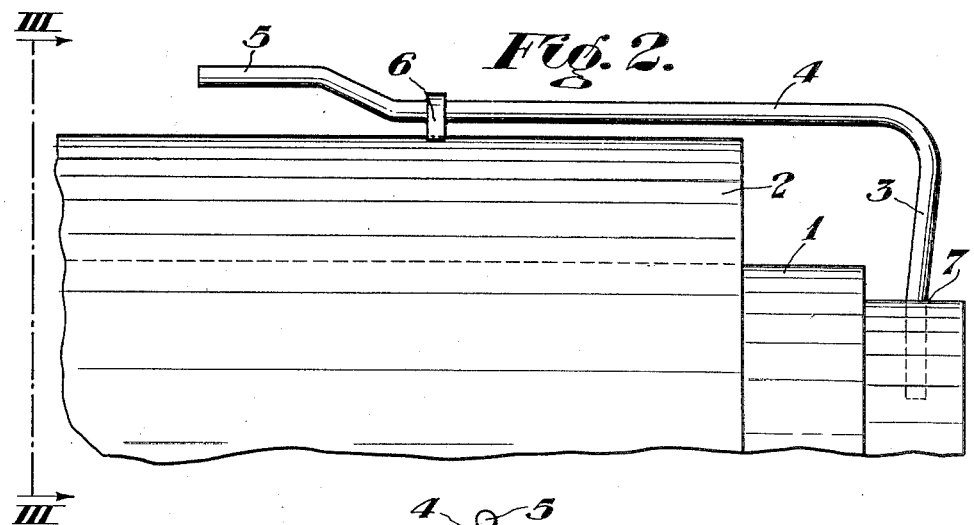
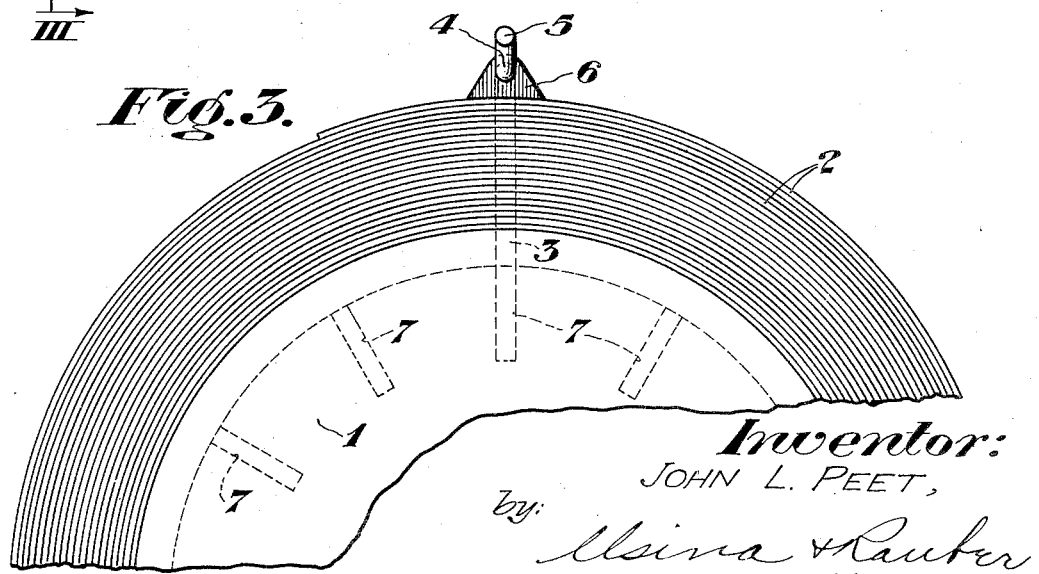
Inventor:
JOHN L. PEET,
by Usina & Rauber
his Attorneys.

Patented Mar. 13, 1934

1,951,062

UNITED STATES PATENT OFFICE 1,951,062

COILED STRIP HOLDER

John L. Peet, Gary, Ind., assignor to American Sheet and Tin Plate Company, a corporation of New Jersey Application October 11, 1932, Serial No. 637,333

5 Claims. (Cl. 206—54)

This invention relates to the handling of strip material when carried on a spool or spindle, the object being to hold its end to prevent it uncoiling. It is also an object to provide means for accomplishing this which is inexpensive, foolproof and sufficiently sturdy to withstand abuse.

Referring to the drawing:

Figure 1 is a side elevation showing an empty reel.

Figure 2 is the same as above but showing a full reel.

Figure 3 is an end elevation of the reel from the line III—III in Figure 2.

A reel 1 carries coiled wide strip 2. The end of this strip is held by a spring metal bar bent at an acute angle to form a short end 3 and a long end 4. The long end 4 is further bent to form a raised handle 5 which extends in a direction parallel to the portion 4 and at a like angle to the short end. Adjacent this handle is a projection 6 which extends in the same direction as the short end and has a curvilinear face. The spool 1 has a socket 7 adjacent one of its peripheral edges, which receives the short end 3 of this bent spring bar.

When it is desired to release the end of the coiled strip a workman grasps the handle 5, raises it slightly so that the projection 6 clears the strip's surface and swings the long arm to a position where the projection will not reengage upon releasal. The short end 3 turns in the socket 7 during this operation and may be easily withdrawn upon its completion.

Reinstallation of the spring bar is effected by radially inserting the short end 3 in the socket 7, swinging the long arm into axial alinement with the reel by means of the handle 5 and thus bringing the projection 6 into engagement. When installed, the spring of the bar prevents withdrawal of its short end 3 and the strip's end is securely held.

There may be a number of the sockets 7 spaced around one or both of the peripheral edges of the spool so that the bar may be registered with the strip's end. The projection 6 is preferably shaped as illustrated to prevent surface damage of the coiled material but might be substituted by other shaped projections or possibly eliminated. Also, the reel 1 illustrated might be a spindle or any other carrier of coiled flat material.

Although a specific form of this invention has been shown and described in accordance with the patent statutes it is not intended to limit its scope exactly thereto, except as defined by the following claims.

I claim:

1. The combination of carrying means for coiled strip, socket means at one end of said carrying means and holding means constructed and arranged for insertion in said socket means and turning movement into spring engagement with the surface of the coiled strip carried by said first named means.

2. The combination of a spool or spindle, a bent spring bar having short and long ends, and one or more sockets constructed and arranged adjacent one of the peripheral edges of said spool or spindle for the reception of the short end of said bent spring bar and to permit turning movement thereof so the long end of the same may be swung into spring contact with any material carried by the spool or spindle.

3. The combination of a spool or spindle constructed to carry coiled strip, a spring metal bar bent at an acute angle to form short and long ends, and one or more sockets constructed and arranged adjacent one of the ends of said spool or spindle for the radial reception of the short end of said bar.

4. The combination of a spool or spindle for carrying coiled strip, a spring metal bar bent to form short and long ends and provided with a projection on its long end and extending in the direction of its short end, and one or more sockets constructed and arranged adjacent one of the peripheral edges of said spool or spindle for the radial reception of the short end of said spring metal bar.

5. The combination of a spool or spindle for carrying coiled strip, a spring metal bar bent at an acute angle to form short and long ends and with its long end bent to form a raised handle extending away from this short end, a projection on the long end of said spring metal bar extending in the direction of its short end, and one or more sockets constructed and arranged adjacent either or both the peripheral edges of said spool or spindle for the radial reception of the short end of said spring metal bar.

JOHN L. PEET.